United States Patent
Whitaker

[19]
[11] Patent Number: 5,918,845
[45] Date of Patent: Jul. 6, 1999

[54] SUPPORT BRACKETS

[75] Inventor: Richard J. Whitaker, Guernsey, United Kingdom

[73] Assignee: Commercial Brains Limited, United Kingdom

[21] Appl. No.: 08/894,745

[22] PCT Filed: Feb. 22, 1996

[86] PCT No.: PCT/GB96/00408

§ 371 Date: Aug. 21, 1997

§ 102(e) Date: Aug. 21, 1997

[87] PCT Pub. No.: WO96/26387

PCT Pub. Date: Aug. 29, 1996

[30] Foreign Application Priority Data

Feb. 24, 1995 [GB] United Kingdom .................... 9503728

[51] Int. Cl.⁶ ........................................................ A47F 5/00
[52] U.S. Cl. ................... 248/288.11; 248/222.11
[58] Field of Search ............................ 248/280.11, 218.4, 248/278.1, 281.11, 123.11, 128, 131, 145, 349.1, 586, 912, 918, 919, 288.11, 221.11, 917

[56] References Cited

U.S. PATENT DOCUMENTS

| | | | |
|---|---|---|---|
| 187,361 | 2/1877 | Davis | 248/281.11 |
| 316,549 | 4/1885 | How | 126/369.3 |
| 1,939,570 | 12/1933 | Potter | 248/288.11 |
| 3,662,981 | 5/1972 | Hogrebe | 248/278 |
| 4,163,538 | 8/1979 | Galione | 248/278 |
| 4,166,602 | 9/1979 | Nilsen et al. | 248/280.1 |
| 4,266,747 | 5/1981 | Souder, Jr. et al. | 248/280.1 |
| 4,687,167 | 8/1987 | Skalka et al. | 248/282 |
| 4,708,312 | 11/1987 | Rohr | 248/280.1 |
| 4,836,486 | 6/1989 | Vossoughi et al. | 248/281.1 |
| 4,844,387 | 7/1989 | Sorgi et al. | 248/1 F |
| 5,277,392 | 1/1994 | Rossman et al. | 248/237.7 |
| 5,398,903 | 3/1995 | Cho | 248/349 |
| 5,609,316 | 3/1997 | Tigliev | 248/123.11 |
| 5,611,513 | 3/1997 | Rosen | 248/222.11 |

*Primary Examiner*—Ramon O. Ramirez
*Assistant Examiner*—Tan Le
*Attorney, Agent, or Firm*—Rudnick & Wolfe

[57] ABSTRACT

The present invention relates to support brackets commonly used to support televisions but which can also be used to support other similar items. A television support bracket (1) is disclosed comprising a platform (9) for receiving and supporting a television apparatus (not shown), the platform (9) being supported via platform support means (33), a brace member (5) extending from the platform support means (33) to a support plate (3) adapted to mount the support bracket (1); a bracket housing (11, 13, 21), the walls (11, 13, 21) of the housing (11, 13, 21) defining a space for receiving cables, arranged such that a television may be mounted upon the support bracket (1) in situ, the bracket (1) arranged such that the cables of the television can subsequently be thread through the platform support means (33) and the space defined within the housing to the upright support plate for connection to a supply. The platform support means (33) can be a tilt and turn mechanism. The invention provides easier mounting and a more easily adjustable tilt and turn mechanism.

22 Claims, 12 Drawing Sheets

SUPPORT BRACKETS

FIELD OF THE INVENTION

The invention relates to an improved support bracket and in particular to support brackets of the type commonly used to support televisions.

BACKGROUND TO THE INVENTION

Typically, such television support brackets comprise a support platform for supporting the electrical device; a mounting member for attaching the bracket to a wall and an arm extending between them. The arm extending between them may be articulated to allow for greater flexibility. Typically, the arm is of rectangular cross section and often is hollow to accommodate cables from the wall to the electrical device.

An example of such a device is described in the applicant's corresponding international application number WO94/18489 which describes a system incorporating hinges through which a cable may be passed. Such a system is arranged such that once the bracket is installed, it is impossible to tamper with the electrical cables. The problem with such a system is the installation of the bracket and device. In such a system, the bracket and electrical device have to be mounted together on a wall. The electrical device is mounted upon the mounting bracket with its electrical cables extending through the system and the whole assembly is then mounted upon a wall. It will be appreciated by the skilled addressee of the specification that this operation can be difficult and hazardous. It is not possible to mount a television onto the bracket already in situ.

Typically, the platform is mounted on a tilt and turn mechanism and when the platform is at the required angle, the tilt and turn mechanism is then fixed into place using screws to secure it into position. Subsequent alteration of the tilt and turn mechanism when the television is on the platform can be complex and awkward.

In the present specification, the term "television support bracket" will be used to describe a support bracket of the type generally used to support televisions but which can be used for any number of electrical devices such as computer display screens, hi-fi systems, microwave ovens and references to a "television" shall be construed accordingly. Reference is also made to wall mounting apparatus. However, it will be appreciated by the skilled addressee of the specification that the apparatus can equally be mounted to any upright body of sufficient strength to support the weight of the bracket and television. Alternatively, the upright member may then extends upwards or downwards to join means for mounting the support bracket either on a ceiling or an upper horizontal surface or a desk or a lower horizontal surface.

SUMMARY OF THE INVENTION

According to a first aspect of the invention, there is provided a television support bracket comprising a platform for receiving and supporting a television apparatus, the platform being supported via platform support means, a brace member extending from the platform support means to a support plate adapted to mount the support bracket; a bracket housing, the walls of the housing defining a space for receiving cables, arranged such that a television may be mounted upon the support bracket in situ, the bracket arranged such that the cables of the television can subsequently be passed through at least part of the support bracket for connection to a supply.

The cabling can therefore preferably pass through the space defined within the housing to the upright support plate. Thus, a television or the equipment can be mounted on eg a wall more easily because the cabling can be passed through the bracket after its mounting instead of before.

Suitably, the cables can be passed through the platform support means.

Suitably, the platform support means comprises a tilt and turn mechanism.

Suitably, the bracket housing is of U-shaped cross-section, the walls of the housing forming side plates extending generally parallel to one another, whereby the space is defined therebetween. Suitably another like housing is provided, typically in an inverted base to base relation with said first housing.

Suitably, the bracket additionally comprises a readily detachable and/or attachable cover plate for the housing.

Thus, the support is arranged such that the support bracket can be mounted upon the wall (or indeed any other upright body), the cover detached from the housing and the television then placed upon the platform. The electrical connections from the television may be thread through the tilt and turn mechanism into the space defined within the housing extending to the wall and the cover may then be placed over the housing. The cover may be affixed to the housing with screws so that when the television has been installed, the cables cannot be accessed without a screwdriver for security purposes. Alternatively, the cover may snap fit to the housing.

The cables from the television may have no plug and may be coupled to cables extending out of the wall and through the upright support plate. Preferably, however, the support bracket is arranged such that a plug may extend through the platform. The cables are then fed into the housing and out of the end of the cover to allow the plug to be put in a socket. The housing could include means for allowing a plug to be passed through the housing close to the wall so that the plug may then be plugged into a socket in the wall. It allows for greater flexibility and easy changing of any system mounted upon the bracket.

According to a second aspect of the invention, there is provided a television support bracket including two upright side plates, each including a concave upwardly facing arcuate support surface, and, extending between the two side plates, a brace member, a platform including a dish shaped projection having a convex lower surface and a correspondingly curved concave upper surface arranged to sit upon the arcuate support surfaces of the side plates, the platform having a bore within the dish shaped area, and a generally top hat shaped locating element comprising an upper bearing member having a generally circular cross section having a diameter greater than the size of the bore within the platform, the upper bearing member being coupled to a lower housing of diameter less than the size of the bore, the upper bearing member including a slot extending from its edge to its centre, the lower housing including an opening corresponding to the slot, and a bore at its end remote from the upper bearing member for receiving a nut for attaching the lower housing to the bracing member such that in use the platform is located by the dish area, supported between the upper bearing member of the top hat shaped location element and the arcuate surfaces of the side plates.

Thus, this provides a tilt and turn mechanism which includes means for varying the tension on the tilt and turn mechanism. The upper bearing member is pulled downwards against the concave upper surface of the dish to apply a force upon the platform to tighten it into position. However, provided that the nut is not too tight, the platform's position and attitude may readily be altered to change the rotational position and attitude of the television supported by the bracket. Preferably, the tilt and turn mechanism is used with the television support in accordance with the first aspect of the invention in that the bracket is for receiving a television installed upon the support bracket. Thus, cables from the television are passed through the bore of the platform and through the slot in the upper bearing member and the opening in the lower housing into the space provided between the two side plates.

Preferably, the bore within the platform is large enough for a plug to be passed through it. Typically, such bore extends from the plate area of the platform through to the dish shaped projection to allow the cable to then be passed through the slot of the upper bearing member and lower housing.

The upper bearing member may include a dish shaped edge so that there is face to face contact between the bearing member and the platform. However, the upper bearing member is preferably plate shaped to provide only a line of contact between the upper bearing member and the platform to provide greater flexibility.

Preferably, the lower housing is arranged such that rotation of the lower housing with respect to the brace member is prevented. Typically, this is in the form of a projection from the lower housing which projects into a slot in the brace member.

Preferably, the cover which extends over the two side plates includes at its end adjacent the platform a nose shaped projection which bears against the cables extending through the platform forcing them into the top hat location element.

It is possible to arrange the system such that the side plates extend from the support end to the upright support plate at one member to form an arm but also the system may be arranged such that the arm is articulated, ie a hinged area is provided between the support platform and the wall plate. In such case, the hinge is arranged such that cable may be subsequently threaded through it without interfering with its operation.

According to a third aspect of the invention, there is provided a television support bracket comprising at least one upright support plate for mounting the bracket, at least two transverse brace members each being coupled at one end to an upright support plate and at its opposite end including locating means for mounting a platform for receiving the television, two substantially identical, substantially parallel side plates of generally tapered shape having a longer edge for affixing to an upright support plate and tapering generally to a shorter edge adjacent the ends of the brace member, each side plate presenting a weight bearing surface at its shorter end for receiving the weight of the platform, the brace members extending between and coupled to the side plates such that they form a general box section.

This construction is very different from any other structures hitherto used for a television support bracket. By using these separate plate-like members, they can be made from pressing equipment and then welded together to give the required strength to support the television.

The mounting bracket is supported via the cantilever effect so that the stresses on the side plates are greatest at their root coupled to the or each upright support plate.

The bracket may include one or two upright support plates. There may be one plate to which each brace member is welded. Alternatively, each brace member may be coupled to a separate upright support plate. Preferably, each brace member is L-shaped with the side of the L forming the upright support plate and the other end extending to the platform.

The or each upright support plate may comprise a wall plate for mounting the bracket to a wall or may just present a planar surface in the region of the bracket and project from the bracket to form or be attached to a variety of alternative mounting means to allow the bracket to be ceiling or desk mounted, for example.

The side plates and one brace member may comprise one single pressing of a generally U-shaped channel giving the structure more strength and simplifying the manufacturing process.

Preferably, the brace member is a plate which includes at least one change in direction so that it is non-planar since this provides torsional stiffness.

Preferably, the support bracket also includes a cover plate which extends over the upper surface of the two side plates to cover any cables carried within. The support bracket preferably also includes a lower cover to cover any cables carried beneath the bracket. This is especially useful if the bracket includes means to mount other equipment such as a video recorder.

It will be appreciated that the side plates may take many forms and do not have to be planar. In fact, a non-planar side wall provides torsional stiffness to the structure.

According to the present invention in a fourth aspect, there is provided a method of mounting a television on a wall the method comprising the steps of:

a) providing a support bracket including a platform for receiving and supporting the television, and a support plate adapted to mount the support bracket;

b) mounting the support bracket on a wall; and c) subsequently passing the television cabling through at least part of the support bracket.

Such a method of mounting is far easier than that used in the prior art because the television need not be supported, often by hand, during the bracket mounting procedure. The television can be mounted on the bracket after the bracket has been mounted on the wall.

BRIEF DESCRIPTION OF THE DRAWINGS

Television support brackets in accordance with all three aspects of the invention will now be described, by way of example only with reference to the accompanying drawings, in which.

DESCRIPTION OF THE PREFERRED EMBODIMENTS

Figure 1:
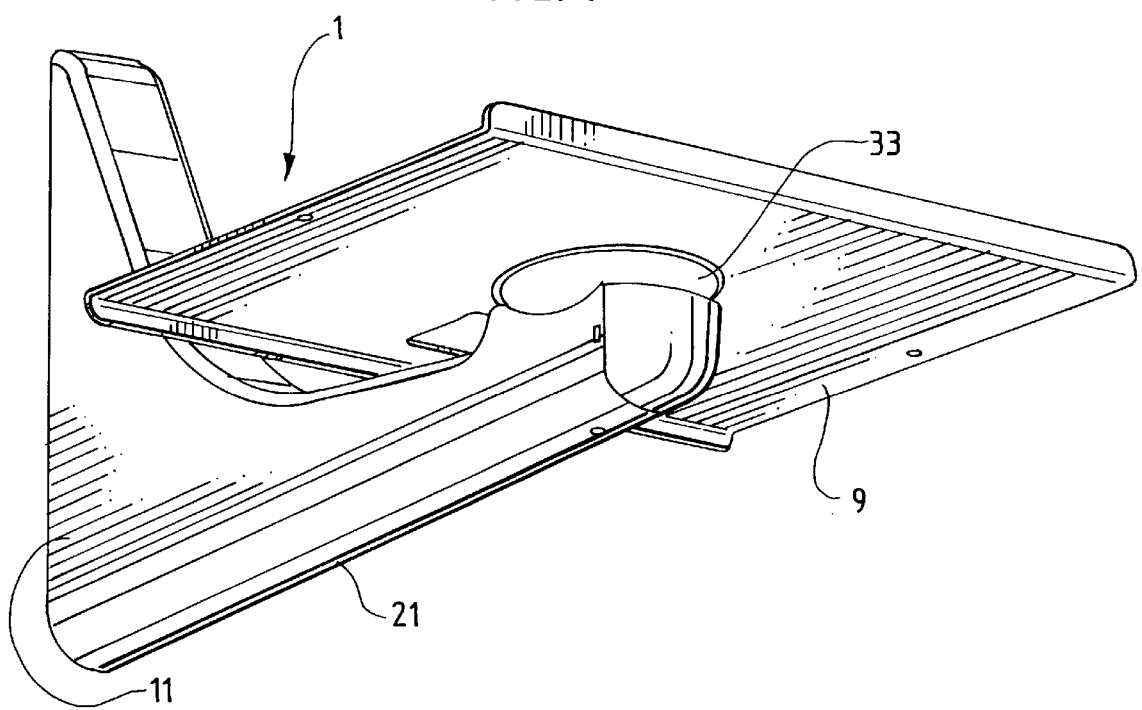
FIG. 1 is a perspective view of a first television support bracket.
Figure 2:
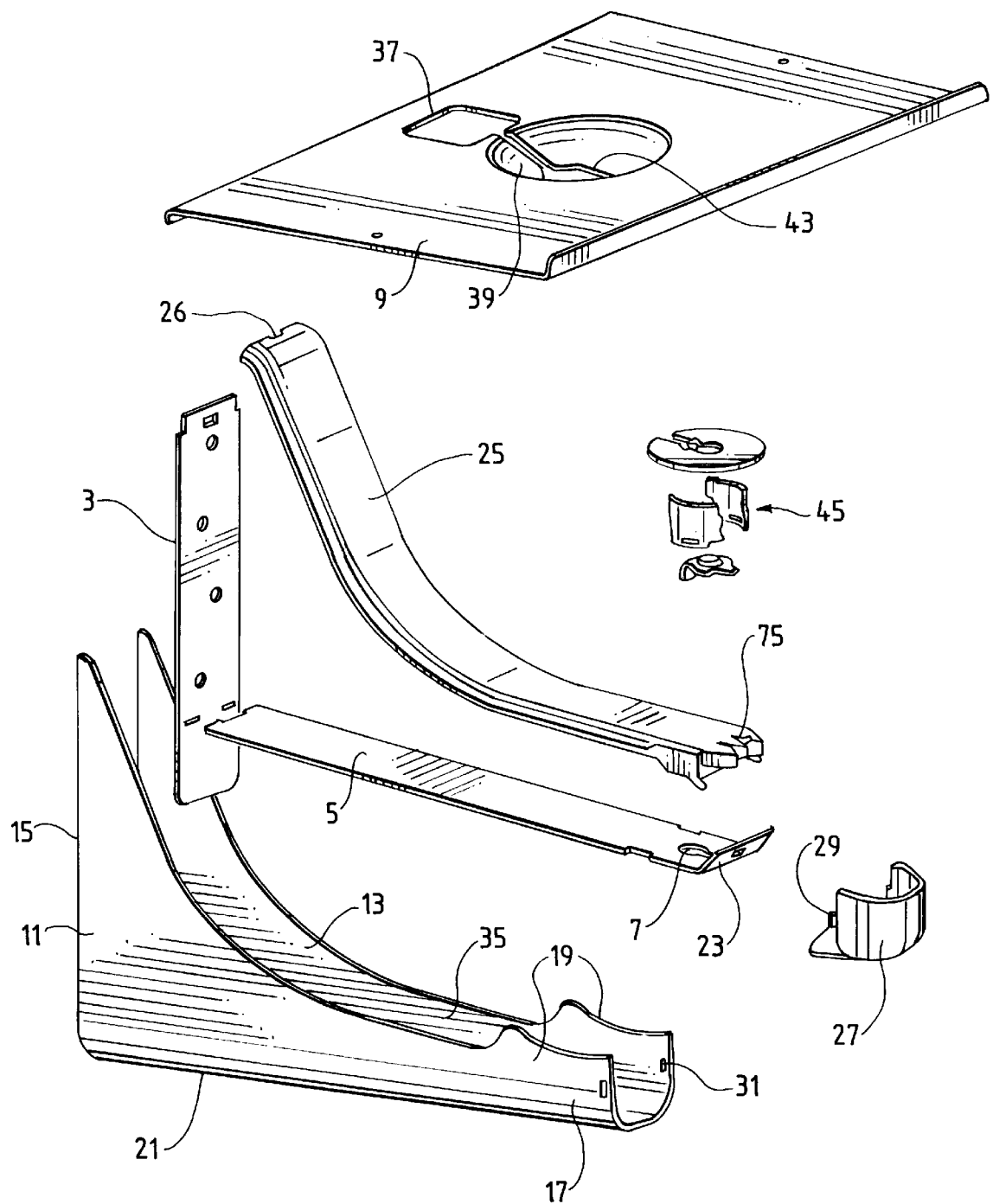
FIG. 2 is an exploded perspective view of the television support bracket illustrated in FIG. 1.
Figure 3:
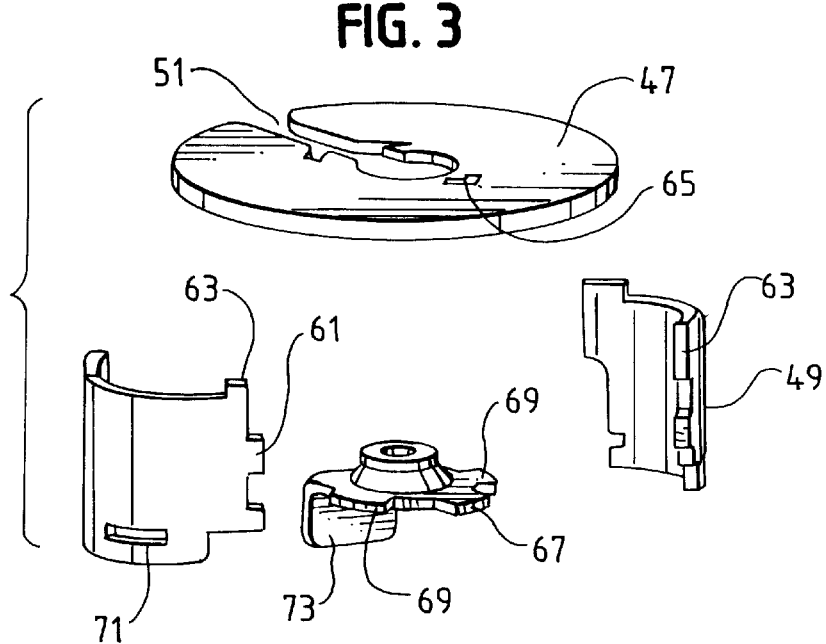
FIG. 3 is an exploded enlarged perspective view of the top hat shaped locating element shown in FIG. 2.
Figure 4:
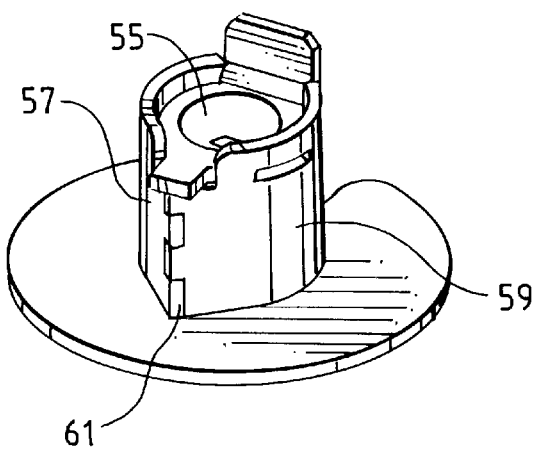
FIG. 4 is a perspective view of the assembled top hat shaped locating element viewed from below.
Figure 5:
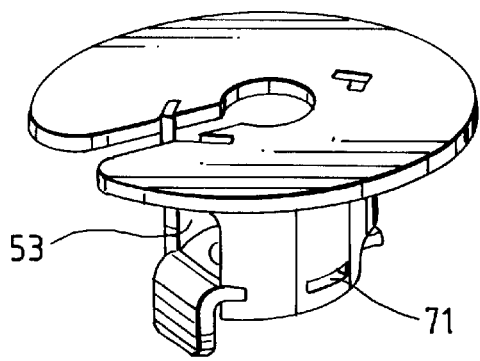
FIG. 5 is a perspective view of the assembled top hat shaped locating element of FIG. 4 viewed from above.
Figure 6:
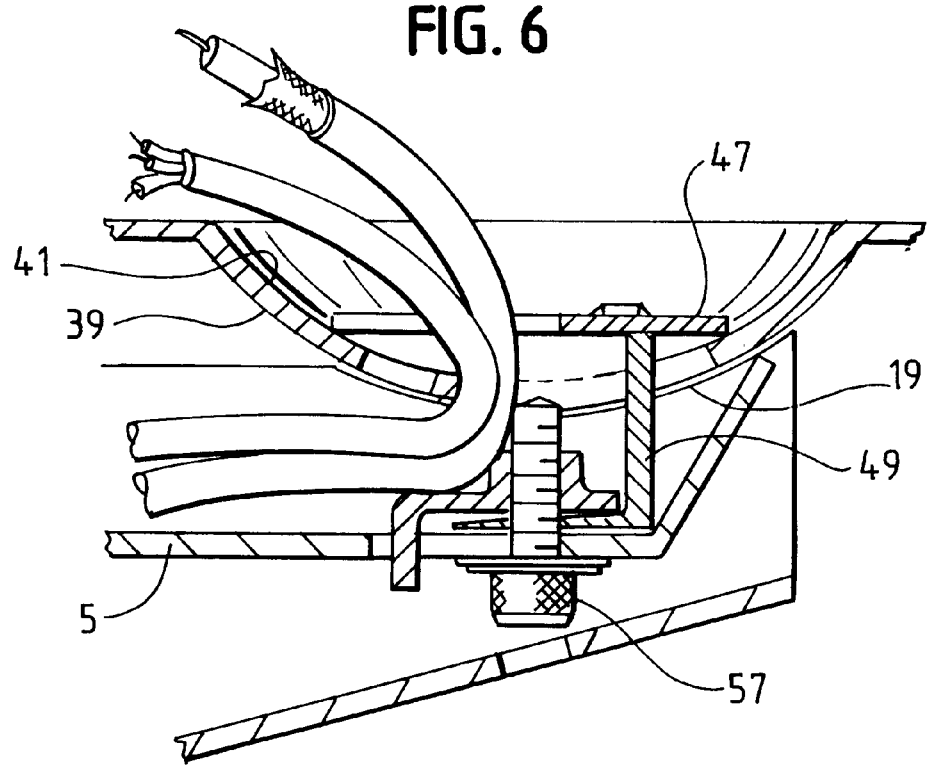
FIG. 6 is a schematic section through part of FIG. 1.
Figure 7:
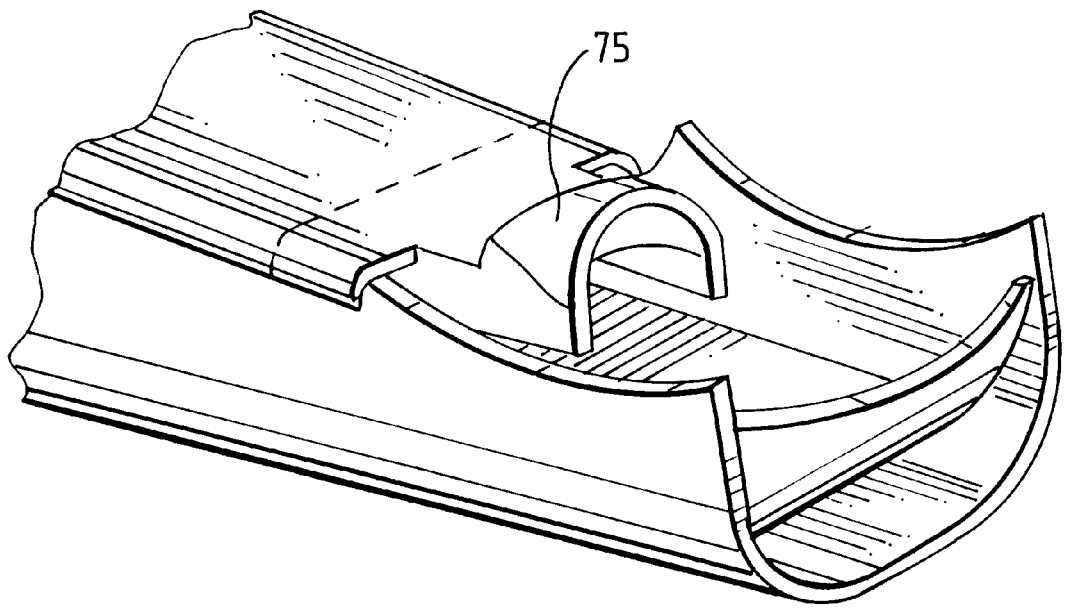
FIG. 7 is an enlarged perspective view of part of the cover (with the bracket and top hat shaped element removed for clarity)

The first television support bracket illustrated in FIGS. 1 to 8 is in accordance with each of the first, second and third aspects of the invention. The television support bracket 1 comprises an upright support plate, in this case wall plate 3 for affixing to a wall, a transverse brace member 5 coupled at one end to the wall plate 3 and at its opposite end including locating means 7 for mounting platform 9 for receiving a television (not shown). It also includes two substantially identical substantially parallel side plates 11, 13 of generally tapered shape having a longer edge 15 for affixing to the wall plate 3 and tapering generally to a shorter edge 17 adjacent to the end of the brace member 5, each side plate 11, 13 presenting a weight bearing surface 19 at its shorter end 17 for receiving the weight of the platform 9. Also included is a lower member 21 for coupling the two side plates 11, 13. The lower member 21 comprises a second brace member. In fact the side plates 11, 13 and the lower member 21 are in one single pressing of generally U-shaped channel. Thus, these separate elements can be made by pressing equipment and then welded together to give a required strength to support a television. The brace member 5 is a plate which includes at least one change in direction 23 to give the plate torsional stiffness. The support bracket also includes cover 25 which extends over the upper surface of the two side plates 11, 13 to cover any cables (not shown) carried within. A nose cap 27 is a further moulding which is provided to clip into the ends of the side plates 11, 13 via projections 29 on the nose cap fitting in slots 31 in the side plates to cover the enclosed fittings.

The platform 9 is supported via a tilt and turn mechanism generally designated at 33. The arrangement of the bracket is such that a television may be mounted upon the support bracket in situ so that the cables of the television may be subsequently thread through the tilt and turn mechanism 33 and the space 35 defined within the housing (11, 13, 21) to the wall plate for connection to a supply.

The platform 9 includes a bore 37 large enough for a plug to be passed through it.

The bearing surfaces 19 of the side plates 11, 13 are concave upwardly facing arcuate support surfaces. The platform 9 includes a dish shaped projection 37 having a convex lower surface 39 and a correspondingly curved convex upper surface 41 arranged to sit upon the arcuate support surfaces 19 of the side plates. The platform 9 has a bore 43 passing therethrough. The system also includes a top hat shaped location element 45 illustrated in more detail in FIGS. 3 to 5. The element 45 comprises an upper bearing member 47 having a generally circular cross section having a diameter greater than the size of the bore 43 within the platform 9. The upper bearing member is coupled to a lower housing 49 having a diameter less than the size of the bore 43. The upper bearing member 47 includes a slot 51 extending from its edge to its centre and the lower housing 49 includes an opening 53 corresponding to the slot 51 and a bore 55 for receiving a bolt 57 for attaching the lower housing 49 to the brace member 5 such that in use the platform 9 is located by its dish area 37 supported between the upper bearing member 47 of the top hat shaped location element 45 and the arcuate surfaces 19 of the side plates.

If bolt 57 is tightened, the upper bearing member 47 is pulled downwards to bear against the concave upper surface of the platform and increase the tension upon the tilt and turn mechanism. However, if the bolt 57 has been loosened enough, the platform 9 is free to rotate about the axis of the bolt 57 and to also tilt by the convex lower surface 39 moving with respect to the curved surfaces 19.

The housing 49 is in the form of two halves 57, 59 which include interlocking teeth 61 to lock them together. Each of the pieces 57, 59 includes an upper projection 63 which locates in an L-shaped slot 65 in the upper bearing member 47. A lower nut member 67 is located with respect to the two halves 57, 59 by projections 69 locating in slots 71 in the housing 57, 59. The nut member 67 includes a downwardly facing projecting member 73 which in use bears against the brace member 5 to prevent rotation of the top hat shaped locating element 45 with respect to the brace member and the nut.

This arrangement is such that the bracket may be assembled and located upon a wall and subsequently a television put in place on the platform 9. The plug of a television can be dropped through bore 37 and the cables then slide along dish shaped projection into bore 43 via slot 51 and opening 53. The cable and plug can then be passed into the space 35 defined within the housing. When cover 25 is snapped into place, the cable may pass through notch 26 allowing the plug to then be plugged into the wall.

The cover 25 includes a nose shaped projection 75 which in use bears against the cable to force them into the locating element 45.

Figure 8:
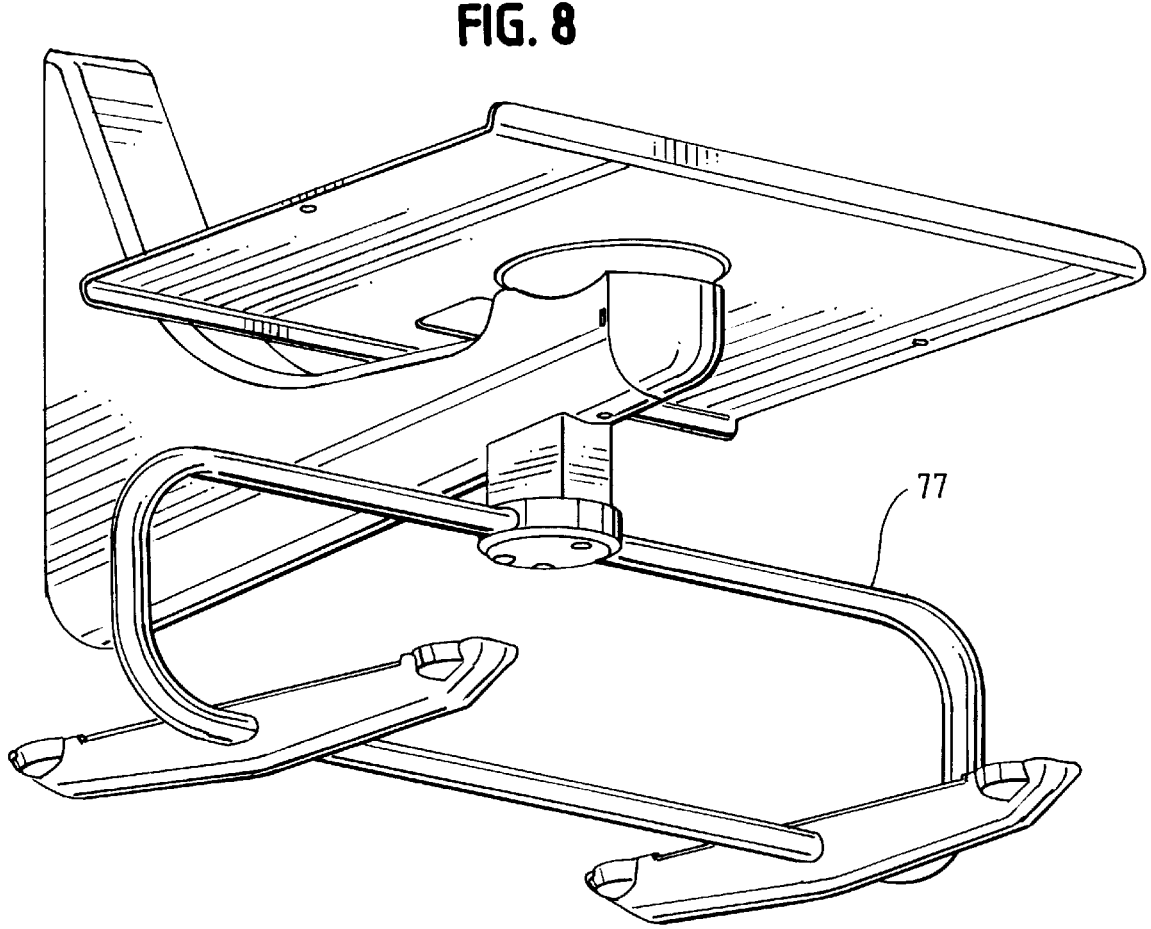
FIG. 8 is a perspective view of the first television support bracket used to support further electrical equipment.

The housing formed by side plates 11, 13 and base 21 can include removal elements to allow further electrical units to be supported. This is illustrated in FIG. 8 where it can be seen that a further support device 77 is coupled to the bracket. This device is for supporting a video.

Figure 9:
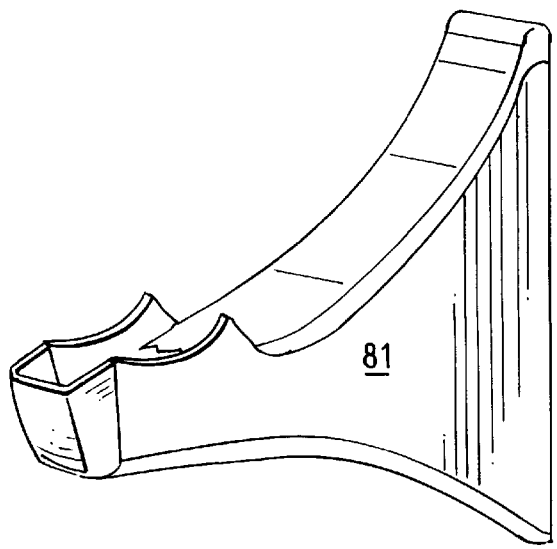
FIG. 9 is a perspective view of a second television support bracket with the platform removed for clarity.
Figure 10:
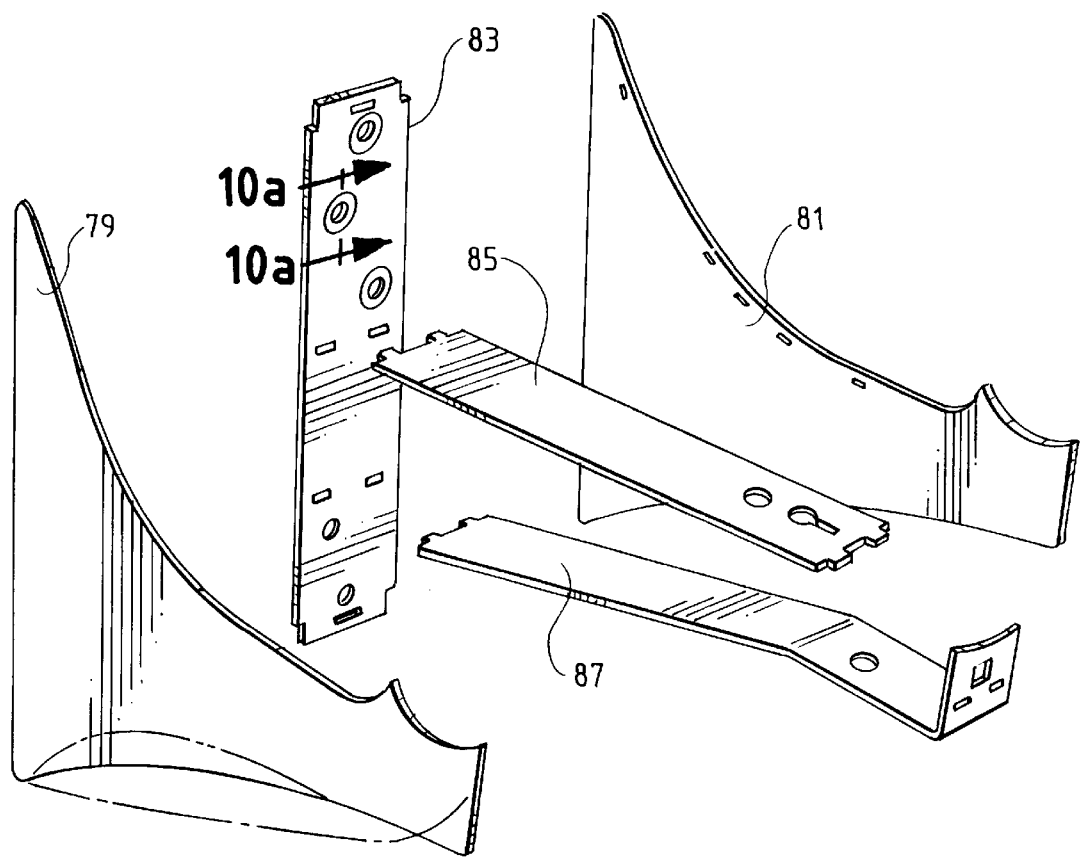
FIG. 10 is an exploded perspective view of the television support bracket illustrated in FIG. 9.
Figure 10A:
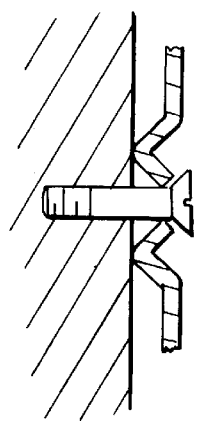
Figure 11:
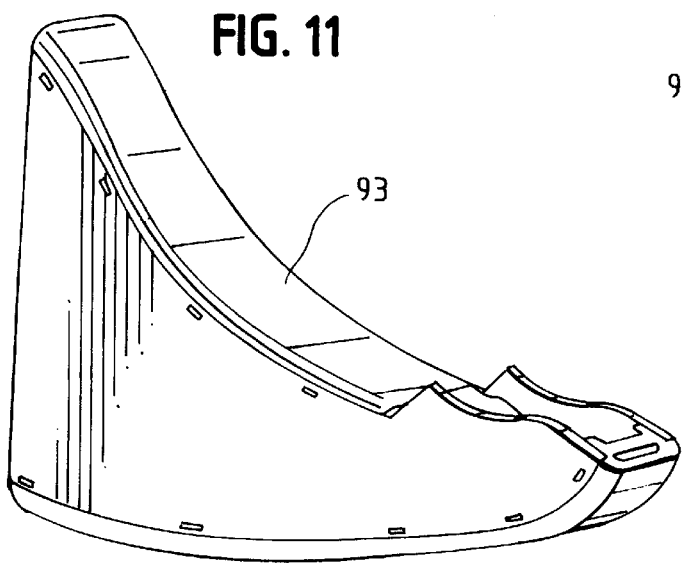
FIG. 11 is a perspective view of a third television support bracket.
Figure 12:
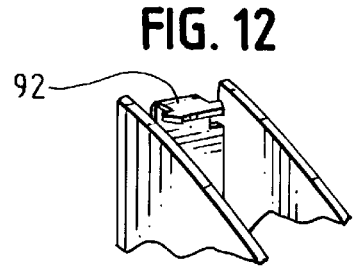
FIG. 12 is a detailed part of the third support bracket.
Figure 13:
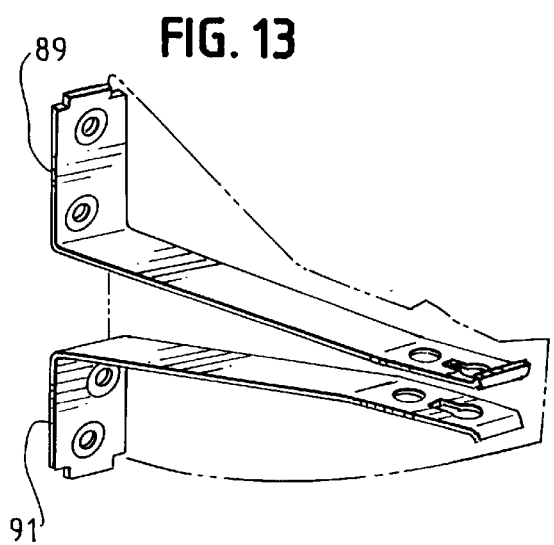
FIG. 13 illustrates the brace members of the third television support bracket.

An alternative embodiment of the invention is illustrated in FIGS. 9 and 10 where the platform and top hat shaped element have been omitted for clarity. In this case, the structural elements comprise two separate side plates 79, 81, a wall plate 83 and two brace members 85, 87. The lower element 87 may be regarded as the base plate. These elements are welded together to give the product strength and then mouldings are placed over the upper and lower edges of the side plates to give the product an aesthetically pleasing appearance.

Figure 14:
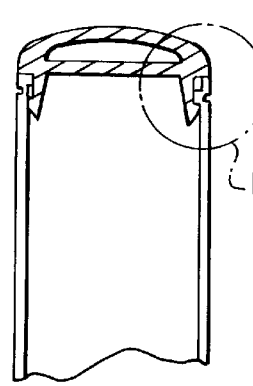
FIG. 14 is a further enlarged section of part of the third television bracket of FIG. 11.
Figure 14A:
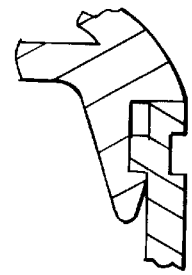
Figure 15:
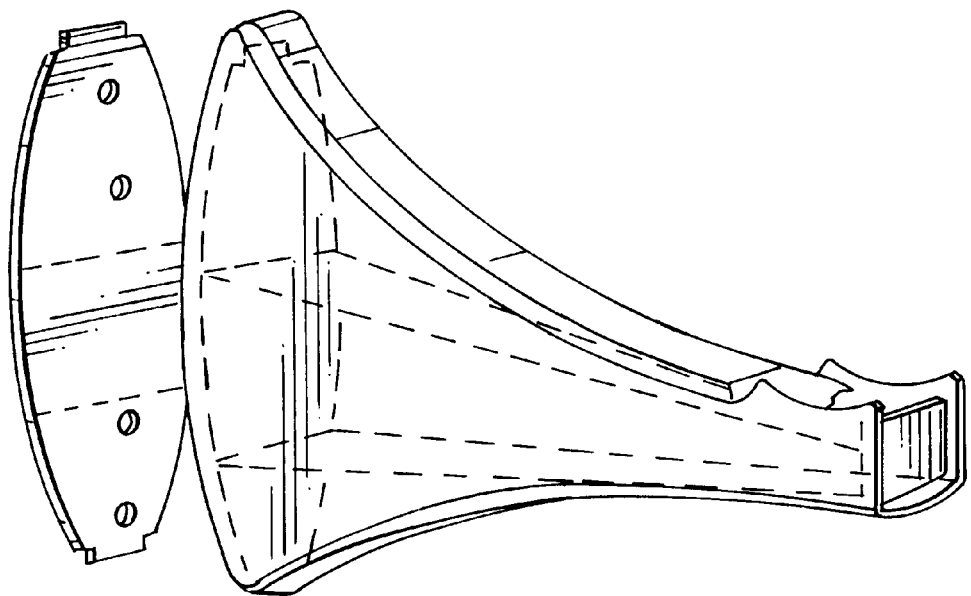
FIG. 15 is a perspective view of a fourth television support bracket.

In a third embodiment of the invention, the arrangement is very similar to that shown in the second embodiment but here the two brace elements 89, 91 are identical and each has an L-shaped appearance, part of which forms the wall plate. The wall plate includes a flange 92 for use in locating the cover 93. The sides of the cover 93 are retained over the side plate by corresponding flanges illustrated in FIG. 14. The edges can be profiled to form a locking surface as would be apparent to the skilled addressee of the specification.

In a fourth and fifth example of a support bracket, it can be seen that the side plates do not have to be planar. In the fourth example, the side plates present a curved profile which add torsional strength.

Figure 16:
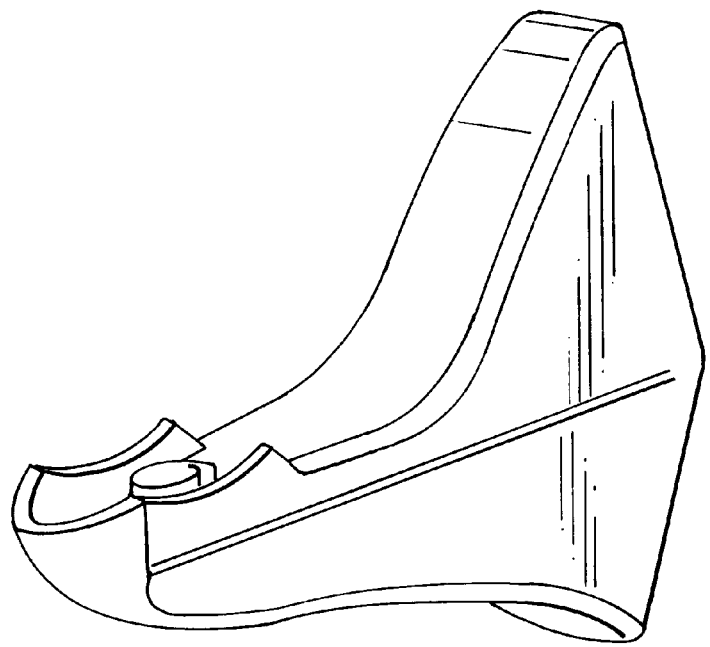
FIG. 16 is a perspective view of a fifth television support bracket.

The fifth example illustrated in FIG. 16 presents an angled profile.

Figure 17:
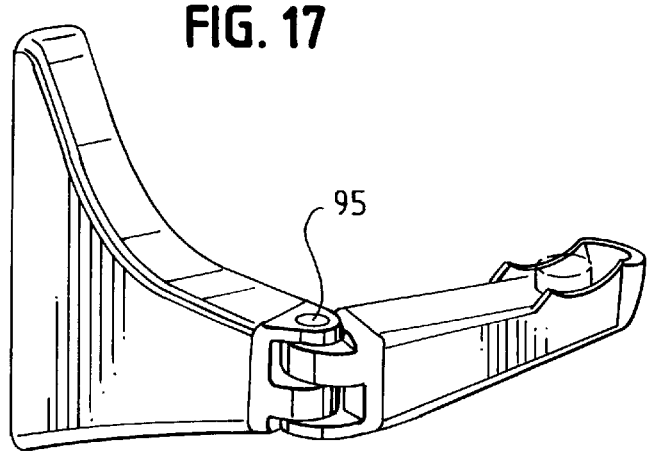
FIG. 17 is a perspective view of the sixth television support bracket.
Figure 18:
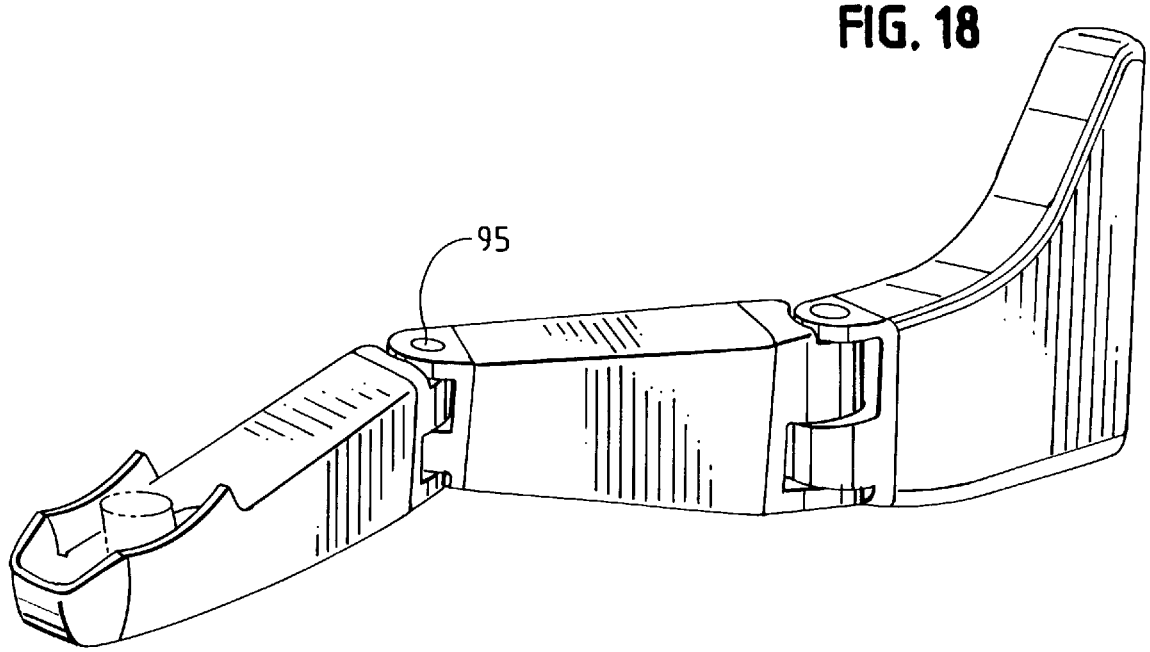
FIG. 18 is a perspective view of a seventh support bracket.
Figure 19:
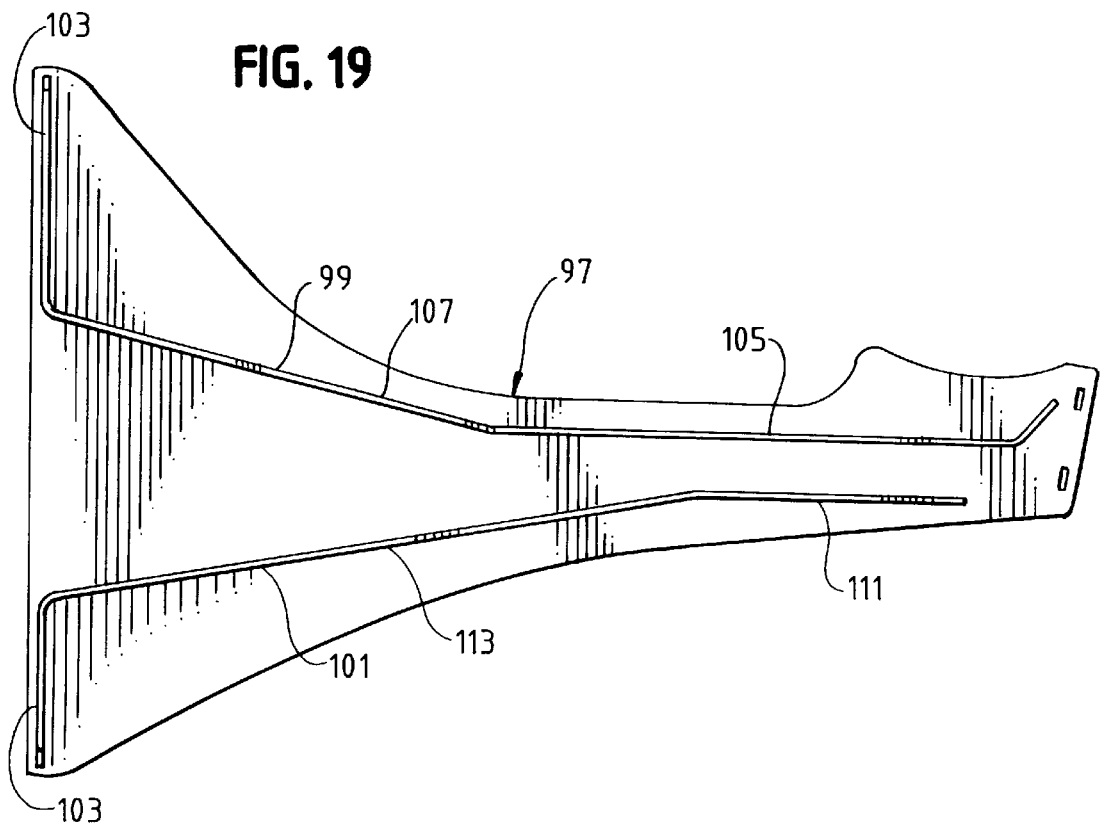
FIG. 19 is a schematic section through part of an eighth support bracket.
Figure 20:
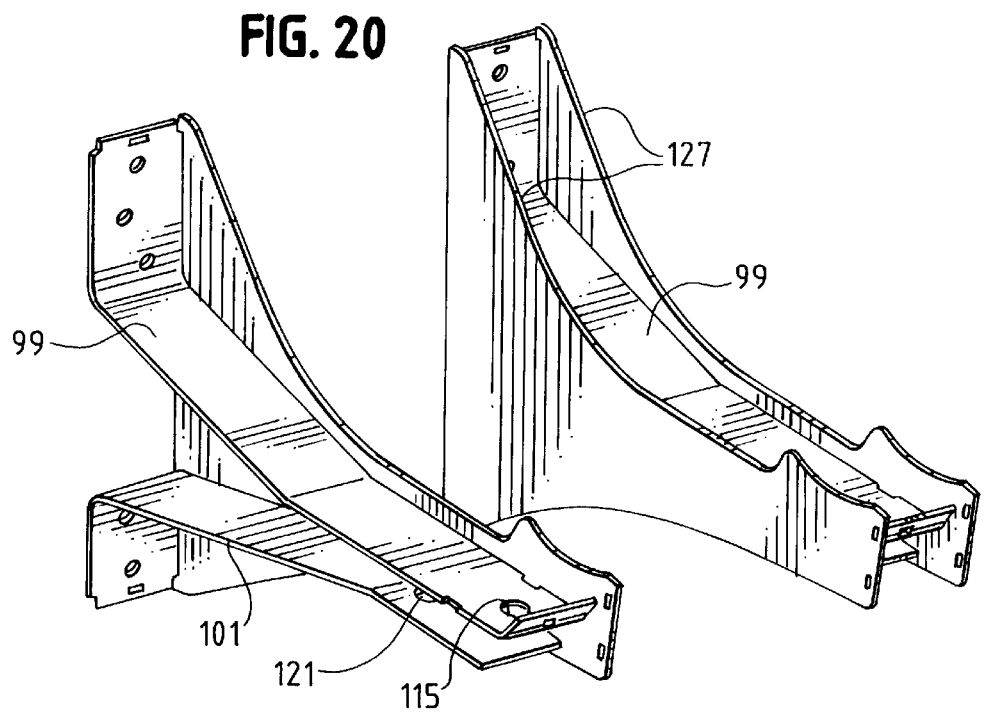
FIG. 20 is a schematic perspective view illustrating the construction of the eighth support member.
Figure 21:
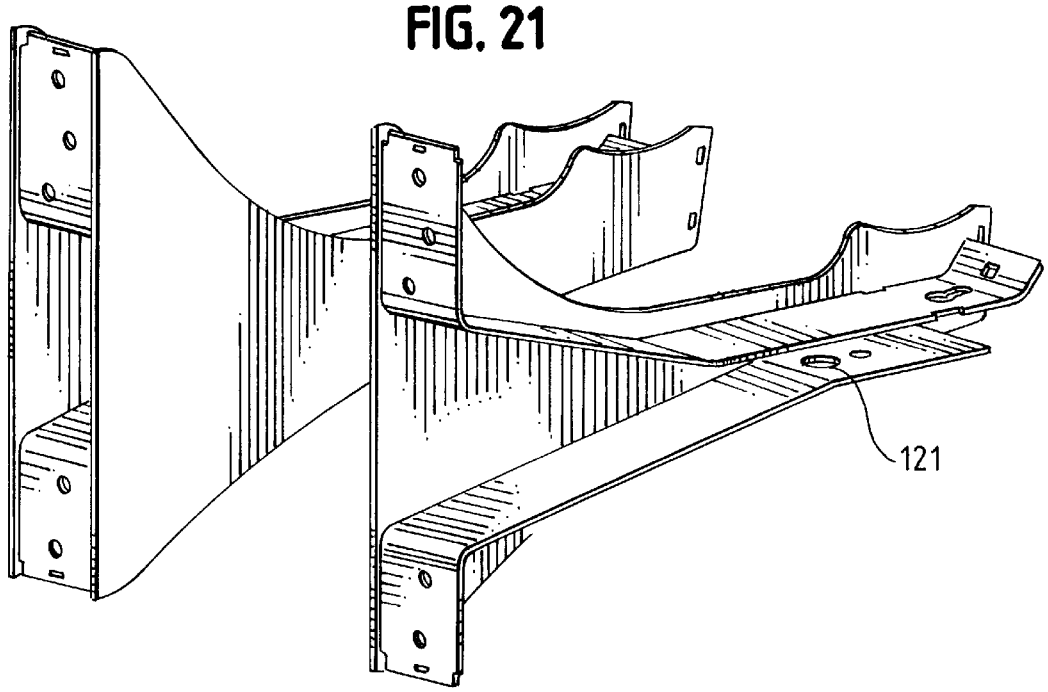
FIG. 21 is a further schematic perspective view illustrating the construction of the eighth support member.

In the sixth and seventh examples illustrated in FIGS. 17 and 18, it can be seen that the bracket may include an articulated arm including one or two hinges 95. In this case, the hinges are arranged such that a cable may be subsequently fed through the hinge without interfering with the operation of the hinge.

The eighth example of bracket 97 is illustrated in FIGS. 19 to 23 which show the metal weight bearing members and omits all covers for clarity. The bracket 97 includes two brace members 99 and 101, each of which includes a leg or flange 103 which forms an upright support plate, each of which is adapted to be mounted upon a wall, or upright member.

The upper and lower brace members 99 and 101 respectively are not identical. The upper member 99 is generally L shaped including the leg 103 and upper member 99 is generally perpendicular to leg 103 and termination in the platform locating area 105. An angled section 107, at 15° to locating area 105 joins locating area 105 to leg 103. This angled area adds strength to the bracket. The lower bracket also includes an end 111 perpendicular to leg 103, joined by angled area 113, in this case 10° to the perpendicular end 111.

The upper brace member 99 includes keyhole slot 115 for receiving the platform 117 and its tilt and turn mechanism 119. The lower brace member 101 includes a hole 121 for receiving means for mounting a video support (not shown).

Figure 22:
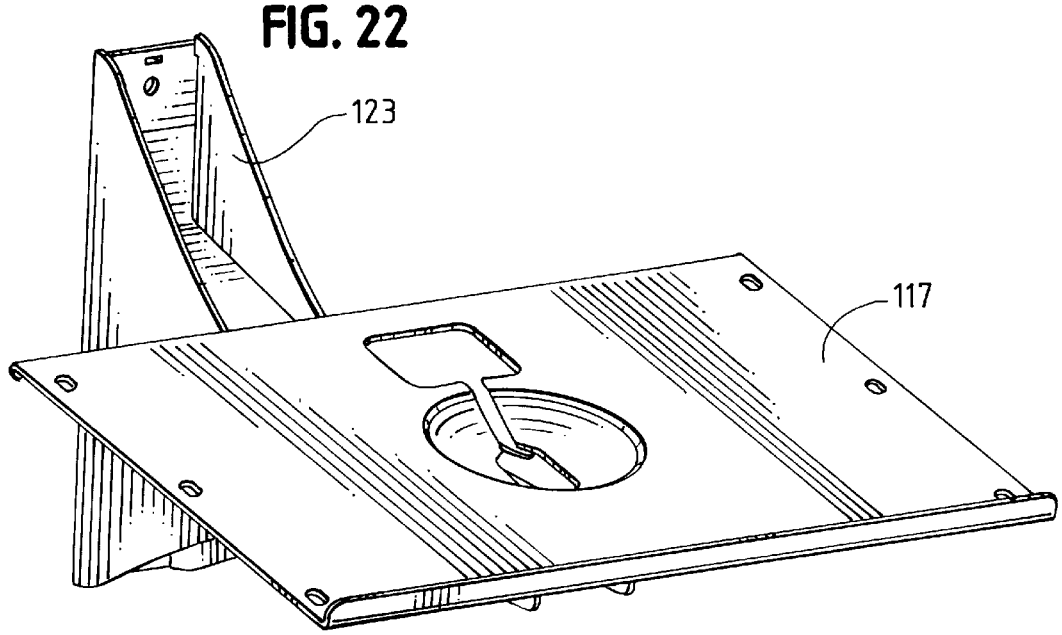
FIG. 22 is a perspective view of the eighth support bracket without its cover.
Figure 23:
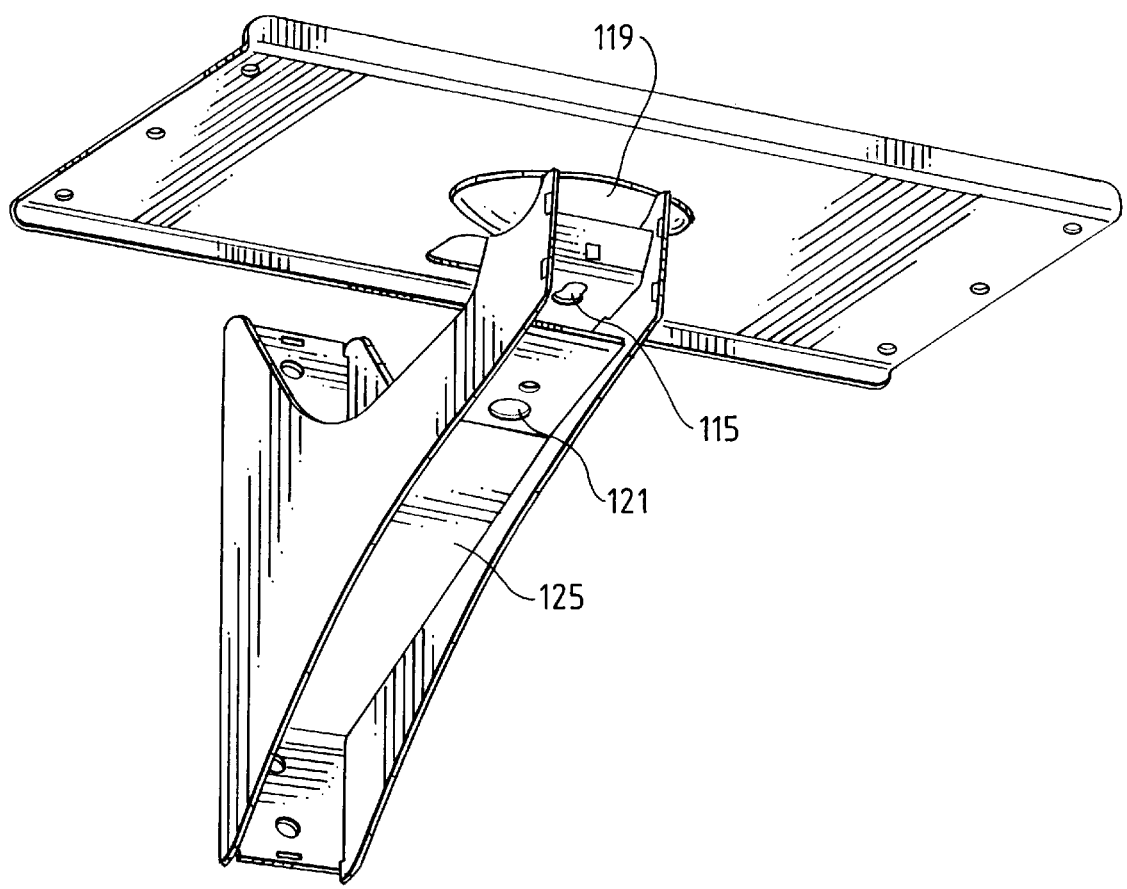
FIG. 23 is a further perspective view of the eighth support bracket.

As illustrated in FIGS. 22 and 23, upper and lower cable receiving spaces 123 and 125 are defined between side plates 127. This means that the television cables and video recorder cable s may be kept separate from one another.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

I claim:

1. A television support bracket comprising a platform for receiving and supporting a television apparatus, the platform being supported via platform support means, a brace member extending from the platform support means to an upright support plate adapted to mount the support bracket; a bracket housing having walls, the walls of the housing defining a space for receiving cables, a readily detachable and/or attachable cover plate for the housing, arranged such that a television may be mounted upon the support bracket in situ, the bracket arranged such that the cables of the television can subsequently be passed through at least part of the support bracket for connection to a supply.

2. A television support bracket according to claim 1, in which the bracket is arranged such that the cables of the television can be passed through the platform support means and/or the housing to the upright support plate.

3. A television support bracket according to claim 1, in which the bracket housing comprises at least one U-shaped cross-section housing, the walls of the or each housing forming side plates extending generally parallel to one another, whereby the space is defined therebetween.

4. A television support bracket according to claim 1, in which the support bracket is arranged such that a power plug may be passed through the platform.

5. A television support bracket including two upright side plates, each including a concave upwardly facing arcuate support surface, and, extending between the two side plates, a brace member, a platform including a dish shaped projection having a convex lower surface and a correspondingly curved concave upper surface arranged to sit upon the arcuate support surfaces of the side plates, the platform having a bore within the dish shaped area, and a generally top hat shaped locating element comprising an upper bearing member having a generally circular cross section having a diameter greater than the size of the bore within the platform, the upper bearing member being coupled to a lower housing of diameter less than the size of the bore, the upper bearing member including a slot extending from its edge to its centre, the lower housing including an opening corresponding to the slot, and a bore at its end remote from the upper bearing member for receiving a nut for attaching the lower housing to the bracing member such that in use the platform is located by the dish area, supported between the upper bearing member of the top hat shaped location element and the arcuate surfaces of the side plates.

6. A television bracket according to claim 5, in which the bore extends from the plate area of the platform through to the dish shaped projection to allow the cable to then be passed through the slot of the upper bearing member and lower housing.

7. A television bracket according to claim 5, in which the upper bearing member includes a dish shaped edge so that there is face to face contact between the bearing member and the platform.

8. A television bracket according to claim 5, in which a cover which extends over the two side plates includes at its end adjacent the platform a nose shaped projection which bears against the cables extending through the platform forcing them into the top hat location element.

9. A television support bracket according to claim 5, which the bracket additionally comprises a readily detachable and/or attachable cover plate for the housing.

10. A television support bracket according to claim 5, in which the support is arranged such that a power plug may be passed through the platform.

11. A television support bracket comprising at least one upright support plate for mounting the bracket, at least two transverse brace members each being coupled at one end to an upright support plate and at its opposite end including locating means for mounting a platform for receiving the television, two substantially identical, substantially parallel side plates of generally tapered shape having a longer edge for affixing to an upright support plate and tapering generally to a shorter edge adjacent the ends of the brace member, each side plate presenting a weight bearing surface at its shorter end for receiving the weight of the platform, the brace members extending between and coupled to the side plates such that they form a general box section.

12. A television bracket according to claim 11, in which each brace member is L-shaped with the side of the L forming the upright support plate and the other end extending to the platform.

13. A television support bracket according to claim 11, in which at least one of the support plates presents a planar surface in the region of the bracket and projects from the bracket to allow the bracket to be mounted on a surface such as a ceiling, a desk, or the like.

14. A television support bracket according to claim 11, in which the side plates and one brace member comprise one single pressing of a generally U-shaped channel.

15. A television support bracket according to claim 11, in which the bracket additionally comprises a readily detachable and/or attachable cover plate for the housing.

16. A television support bracket according to claim 11, in which the support bracket is arranged such that a power plug may be passed through the platform.

17. A method of mounting a television on a wall, the method comprising the steps of:
   a) providing a support bracket including a platform with a bore therethrough for receiving and supporting the television, a bracket housing and a support plate adapted to mount the support bracket;
   b) mounting the support bracket on a wall via the support plate;
   c) resting the television on the platform; and
   d) subsequently passing cabling for the television through the bore of the platform and the housing for connection to a supply.

18. The method of claim 17 further comprising the step of:
   e) attaching a cover plate to the housing after cabling for the television is placed therein.

19. A television support bracket comprising an upright support plate for mounting the bracket, a brace member having one end coupled to the upright support plate and an opposite end featuring a means for mounting a platform, said platform receiving the television, two substantially identical, substantially parallel side plates each of generally tapered shape having a longer edge for affixing to the upright support plate and tapering generally to a shorter edge adjacent the opposite end of the brace member, each side plate presenting a weight bearing surface near its shorter edge for receiving the weight of the platform, the brace member extending between and coupled to the side plates.

20. A television support bracket comprising:
   a) a platform upon which a television apparatus may rest, said platform including a dish shaped projection;
   b) two upright side plates, each including a concave upwardly facing arcuate support surface, said arcuate support surfaces supporting the dish shaped projection of the platform in a slidable fashion, said upright side plates forming walls of a bracket housing and defining a space therebetween for receiving cables;
   c) a brace member extending between the two side plates from the arcuate support surfaces to an upright support plate adapted to mount the support bracket;
   whereby a television may be mounted upon the support bracket in situ with the cables of the television subsequently passed through the bracket housing to the upright support plate for connection to a supply.

21. The television support bracket of claim 20 further comprising a readily detachable and/or attachable cover plate for the housing.

22. The television support bracket of claim 20 wherein said platform has a bore through which cables may pass, said bore in communication with the space of said bracket housing.

* * * * *